United States Patent [19]
Baba et al.

[11] Patent Number: 6,076,822
[45] Date of Patent: Jun. 20, 2000

[54] AUTOMATIC DOCUMENT FEEDER

[75] Inventors: Kenji Baba; Kunio Kasai, both of Yamanashi-ken, Japan

[73] Assignee: Nisca Corporation, Yamanashi-ken, Japan

[21] Appl. No.: 08/989,263

[22] Filed: Dec. 11, 1997

[30] Foreign Application Priority Data

Dec. 12, 1996 [JP] Japan ................................. 8-352321
Jan. 23, 1997 [JP] Japan ................................. 9-25886
Jun. 13, 1997 [JP] Japan ................................. 9-173161

[51] Int. Cl.$^7$ ................................. B65H 5/00
[52] U.S. Cl. ................................. 271/10.09; 271/10.11
[58] Field of Search ................................. 271/3.01, 3.05, 271/4.01, 4.08, 4.09, 4.1, 10.01, 10.09, 10.1, 10.11, 10.12

[56] References Cited

U.S. PATENT DOCUMENTS 4,936,563  6/1990  DuBois ................................. 271/4.01
5,090,675  2/1992  Nagai et al. ......................... 271/10.12
5,887,865  3/1999  Ishimaru ............................. 271/4.1

FOREIGN PATENT DOCUMENTS 7-109060  4/1995  Japan.
8-133551  5/1996  Japan.

Primary Examiner—David H. Bollinger
Attorney, Agent, or Firm—Kanesaka & Takeuchi

[57] ABSTRACT

An automatic document feeder is formed of a platen including a reading position for reading an image of a transferring document, a feed roller device for transferring the document to the reading position on the platen, a register roller device for supplying the document to the feed roller, and a control device for controlling the register roller device so as to transfer in the reading position at substantially the same speed as document transferring speed of the feed roller; wherein in the step of transferring the document, the control device momentarily accelerates a speed of the document transferred by the register roller faster than a speed of feeding the document by the feed roller device.

13 Claims, 9 Drawing Sheets

READING POSITION

AUTOMATIC DOCUMENT FEEDER

BACKGROUND OF THE INVENTION AND RELATED ART STATEMENT

The present invention relates to a document transferring apparatus for an image forming apparatus, such as an image reading apparatus, and for example, relates to an automatic document feeder which separates a plurality of documents stacked on a document placing table into one sheet and supplies the same to an image forming apparatus, for example, an image reading apparatus.

As an automatic document feeder for an image forming apparatus, there has been generally known an apparatus disclosed in the Japanese Patent Publication (KOKAI) No. H8-133551. By referring to FIG. 9, a summary of this automatic document feeder is explained below.

In FIG. 9, numeral 1 designates an image forming apparatus main body; 2 designates a platen glass which is disposed in the image forming apparatus main body 1 for placing the document thereon in case of reading a thick document such as a book; 3 designates reading means, such as CCD, for reading the document on the platen glass 2; 4 designates an automatic document feeder attached to the image forming apparatus main body 1 to be able to open and close such that it covers the platen glass 2. Incidentally, 5 designates a platen glass for reading the document in case of automatic document feeding by using the automatic document feeder 4.

Here, the reading means 3 reads a document, which is transferred by automatic document feeding, at a predetermined reading position, and also, transfers to read the document in case the thick document such as a book is placed on the platen glass 2.

The automatic document feeder 4 is formed of a platen cover 7 including a white sheet 6 pressing a thick document, such as a book, onto the platen glass 2, a document supply table 8, an ejection table 7b formed on an upper surface of the platen cover 7, and a document transfer section 9; and is disposed to freely open and close with respect to the platen glass in the image forming apparatus.

In the document transfer section 9, documents placed on the document supply table 8 are separated into one sheet by separating means 9h disposed in a document supply part 9a, and supplied, an then a leading edge of the document abuts against register means 9i so as to align the documents. Then, the document transferred by the register means 9i to a transfer part 9c is supplied by rollers 9j and 9f, which are pressed against a feed roller 9b, to a reading position of the reading means 3 to be read. The read document is supplied by the feed roller 9b and a roller 9g to an ejection part 9e, and ejected onto the ejection table 7b by ejecting means 9k. Further, when a double-sided document is read, the document sent to the ejection part 9e is switched back, and again introduced to the transfer part 9c.

Incidentally, in the aforementioned automatic document feeder 4, when a rear edge of the document passes respectively from the separating means 9h and the register means 9i in the paper supply part 9a and from the rollers 9j and 9f disposed at an entrance of the transfer part 9c, although the feed roller 9b is rotated at the predetermined speed, the document is momentarily stopped, and it occurs that a vibration is applied to the document which is being read. Accordingly, there was a disadvantage such that quality of image (differential linearity) of the copied document after being read is deteriorated.

Furthermore, the vibration applied to the document which is being read occurs not only when the rear edge of the document is taken out from or passes through the aforementioned rollers, but also when a leading edge of the document being read abuts against a roller 9g or a guide for leading to the roller 9g located in the side of the stream lower than the reading position.

Namely, in the paper supply and ejection steps, a problem occurs whenever the rear edge of the document passes through various rollers such as the driving roller for feeding the document, or whenever the leading edge of the document abuts against the roller or the guide.

Also, in the document transfer step, especially in the paper supply steps from the paper supply part 9a to the reading position, when the printed letter or dust peeled off from the document is clung to or adhered to the platen glass 5, there is a problem such that the reading means 3 reads this printed letter and the deterioration of the image quality (black lines) occurs.

The present invention has been made in view of the aforementioned circumstances, and an object of the invention is to provide an automatic document feeder which can prevent the deterioration of the image quality in the document transfer steps.

Also, another object of the invention is to provide an automatic document feeder which can prevent the deterioration of the image quality due to the printed letters or dust peeled off from the document in the paper supply step.

SUMMARY OF THE INVENTION

The present invention provides an automatic document feeder which is formed of a platen including a reading position for reading an image of the transferring document, feed roller means for transferring the document to the reading position on the platen, roller means for supplying the document to the feed roller means, and control means for controlling the roller means so as to transfer in the reading position at substantially the same speed as the document transferring speed of the feed roller means; wherein in the step of transferring the document, the control means is set such that the document transferred by the roller means is momentarily faster than the speed of feeding the document by the feed roller means.

Also, another invention is an automatic document feeder which is formed of a platen including a reading position for reading an image of the transferring document, first transferring means disposed in an upstream transfer path, second transferring means disposed in a downstream transfer path, a curved transfer path for guiding the document from the first transferring means to the second transferring means through the platen; wherein the automatic document feeder is further provided with a transfer belt which is disposed along the curved transfer path and guides the document passing through the platen to the second transferring means.

DETAILED DESCRIPTION OF PREFERRED EMBODIMENTS

Figure 1:
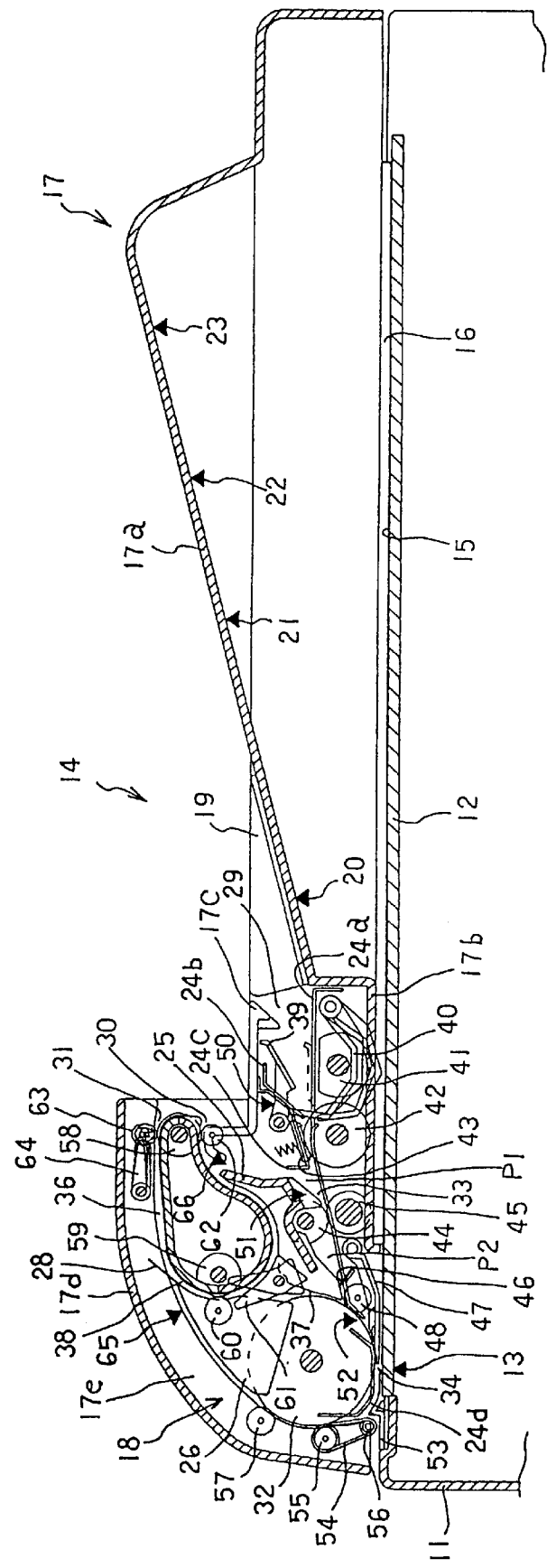
FIG. 1 is a vertical section view of a document transferring apparatus according to one embodiment of the present invention.
Figure 2:
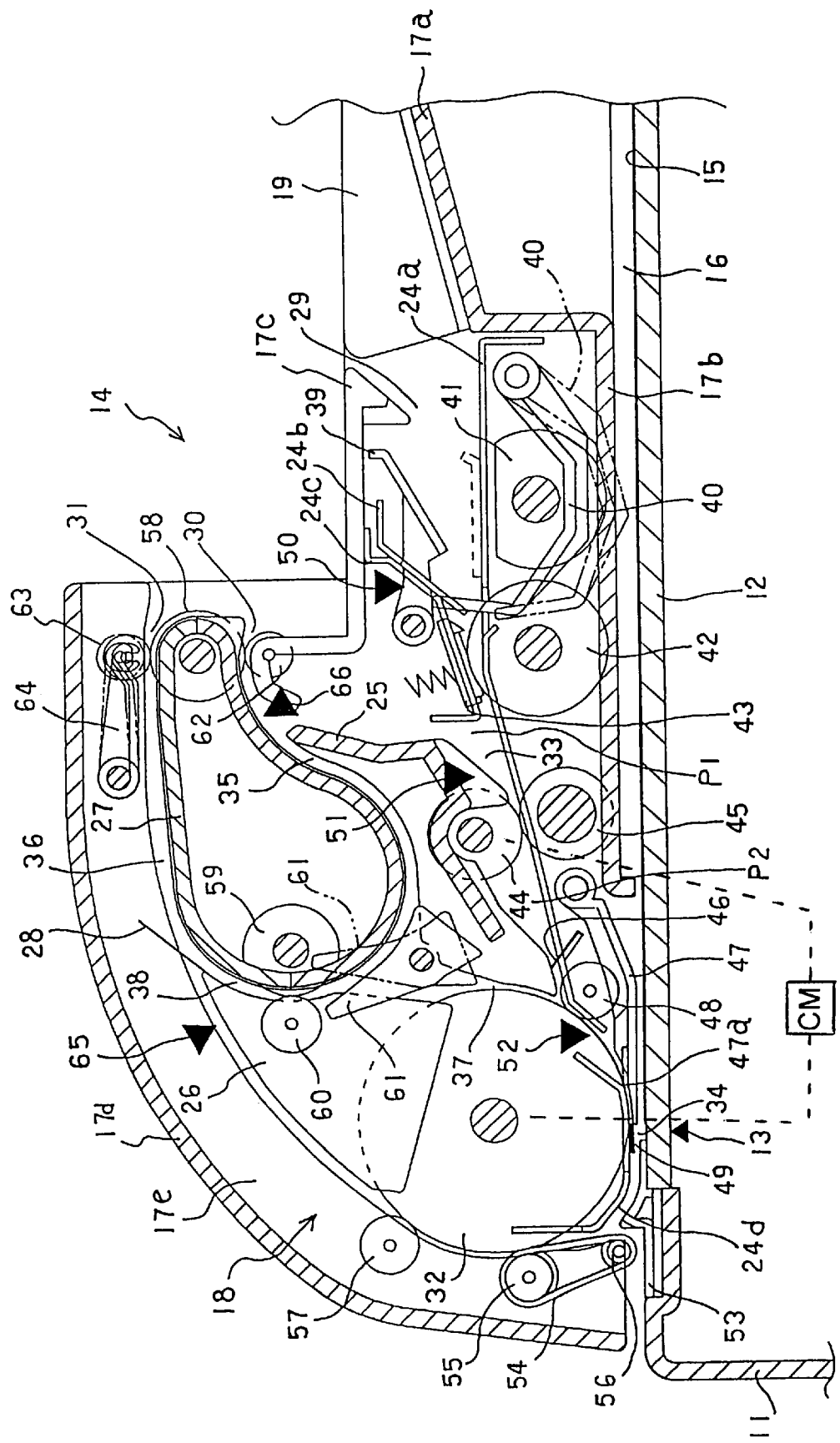
FIG. 2 is a magnified vertical section view of a main part of the document transferring apparatus.

Hereinafter, an embodiment of the present invention will be explained by referring to the drawings. FIG. 1 shows a whole structure of a document transferring apparatus in the embodiment of the present invention, and FIG. 2 shows a main part thereof. Firstly, the whole structure is explained.

In FIG. 1, numeral 11 designates an image forming apparatus main body; 12 designates a platen glass disposed in the image forming apparatus main body 11; 13 designates reading means for reading an image of the document; and 14 designates a document transferring apparatus rotatably attached to the document transferring apparatus main body 11 so as to cover the platen glass 12.

Here, a position of the reading means 13 shown in FIG. 1 and FIG. 2 is a position when automatically feeding the document, and the reading means 13 is fixed at this position to read the document automatically transferred. Also, in case of manually placing the document, i.e. when the document is placed on the platen glass 12, the reading means is transferred toward right in the figures so as to read the document.

The document transferring apparatus 14 is provided with a resin cover main body 17 attached with a platen cover 16 including a white sheet 15 facing against the platen glass 12 on a front surface thereof, and a document transfer part 18 disposed on one end side of the cover main body 17.

The cover main body 17 includes a base portion 17b in which one part thereof is inclined as a document stack part 17a; a paper ejection plate 17c disposed above the base portion 17b; a document transfer part cover 17d for covering the document transfer part 18; and a rib 17e which is projected at an inner side of the document transfer part cover 17d to form a document transfer path. Also, on the stack part 17a of the cover main body 17, there are provided a slide-type side guide member 19 regulating both ends of the width direction of the document; a document width detecting sensor (not shown) for detecting the width of the document placed on the stack part 17a by a transfer position of the slide-type side guide member 19; and a plurality of document length detecting sensors 20, 21, 22, 23 for detecting the length of the document placed on the stack part 17a. By these sensors, the size of the document placed on the stack part 17a is detected.

As shown to be magnified in FIG. 2, the document transfer part 18 includes a plurality of guide plates 24a through 24d, a plurality of guide members 25, 26, 27, and Mylar® 28.

Here, the guide plate 24a is disposed to continue to the document stack part 17a, and there is formed a paper supply inlet 29 for supplying a document placed on the stack part 17a to a distal end side of the guide plate 24a. Further, a first paper ejection outlet 31 is formed by the guide member 27 and the rib 17e, and thereunder, the second paper ejection outlet 30 is formed by the guide member 27 and a rear end of the paper ejection plate 17c. Incidentally, the first and second paper ejection outlets 31 and 30 are disposed above the paper supply inlet 29.

The paper ejection plate 17c is disposed between the paper supply inlet 29 and the first and second paper ejection outlets 31 and 30, and since the paper ejection plate 17c supports a rear end side of the document ejected from the first and second paper ejection outlets 31 and 30, the document in the paper supply side is distinguished from the document in the paper ejection side, so that the ejected document is not supplied from the paper supply inlet 29. Therefore, there is no incident such that the document in the paper ejection side is hidden by the supply table 8 as in the conventional apparatus, and handling of the documents can be facilitated. Incidentally, the paper ejection plate 17c is not limited to a shape of a plate as described above, and is sufficient to have a function such that the rear end of the ejected document does not enter into the paper supply side, and for example, can be Mylar® or a wire rod.

Next, as paths for transferring and reading the document, on the platen glass 12, there are formed a reading part 34 for reading the document by the reading means 13; a paper supply path 33 for guiding a document from the paper supply inlet 29 to the reading part 34; a first paper ejection path 36 for guiding the document from the reading part 34 to the first paper ejection outlet 31; a second paper ejection path 35 for guiding the document from the first paper ejection outlet 31 to the second paper ejection outlet 30; and a circulation path 37 for returning the document from the first paper ejection outlet 31 to the paper supply path 33.

In the paper supply path 33, there are provided a rotatable weight piece 39 which is disposed in the vicinity of the paper supply inlet 29 to press the uppermost surface of the document; a document stopper 40 which abuts against the leading edge of the document to position the document on the stack part, respectively 17a; a paper supply roller 41 in a substantially semicircular shape which slidingly contacts with the lowermost document on the stack part respectively 17a so as to supply the documents; a separation roller 42 and a separation pad 43, which separate and take out the documents supplied by the paper supply roller 41 into one sheet; a register roller 44 which registers the document taken out by the separation roller 42 and the separation pad 43; and a register auxiliary roller 45 which is paired with the register roller 44.

Here, between the separation roller 42 and the register roller 44 in the paper supply path 33, and between the register roller 44 and a second register roller 48, there are formed spaces P1 and P2 which allow bending of the document sent from the paper supply inlet 29.

In the reading part 34, there are provided a feed roller 32 for transferring the document from the register roller 44 to the reading part 34 to pass therethrough; the second register roller 48 which abuts against a peripheral surface of the feed roller 32 to lead the document to the reading part 34 and to register the document from the circulation path 37; the guide plate 24d disposed below the feed roller 32, and a read white Mylar® 49 provided in the guide plate 24d, wherein the document passes through between the guide plate 24d and the platen glass 12; an abutting scale 53 which becomes a standard when the thick document such as a book is set and which is disposed in the image forming apparatus 11 so as to guide the transferred document after being read to the first paper ejection path 36.

Figure 3:
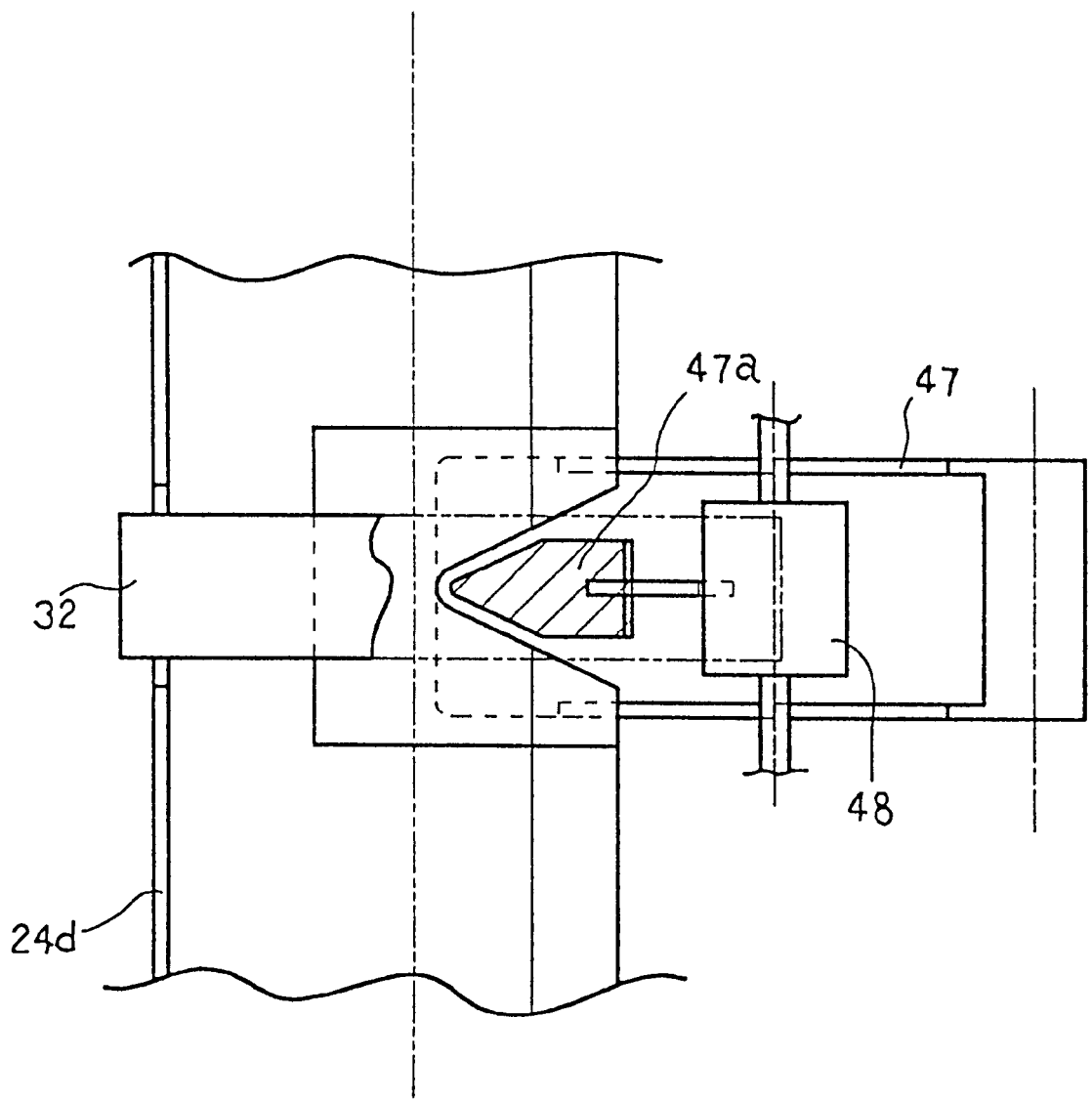
FIG. 3 is a top plan view of a reading part of the document transferring apparatus.
Figure 4:
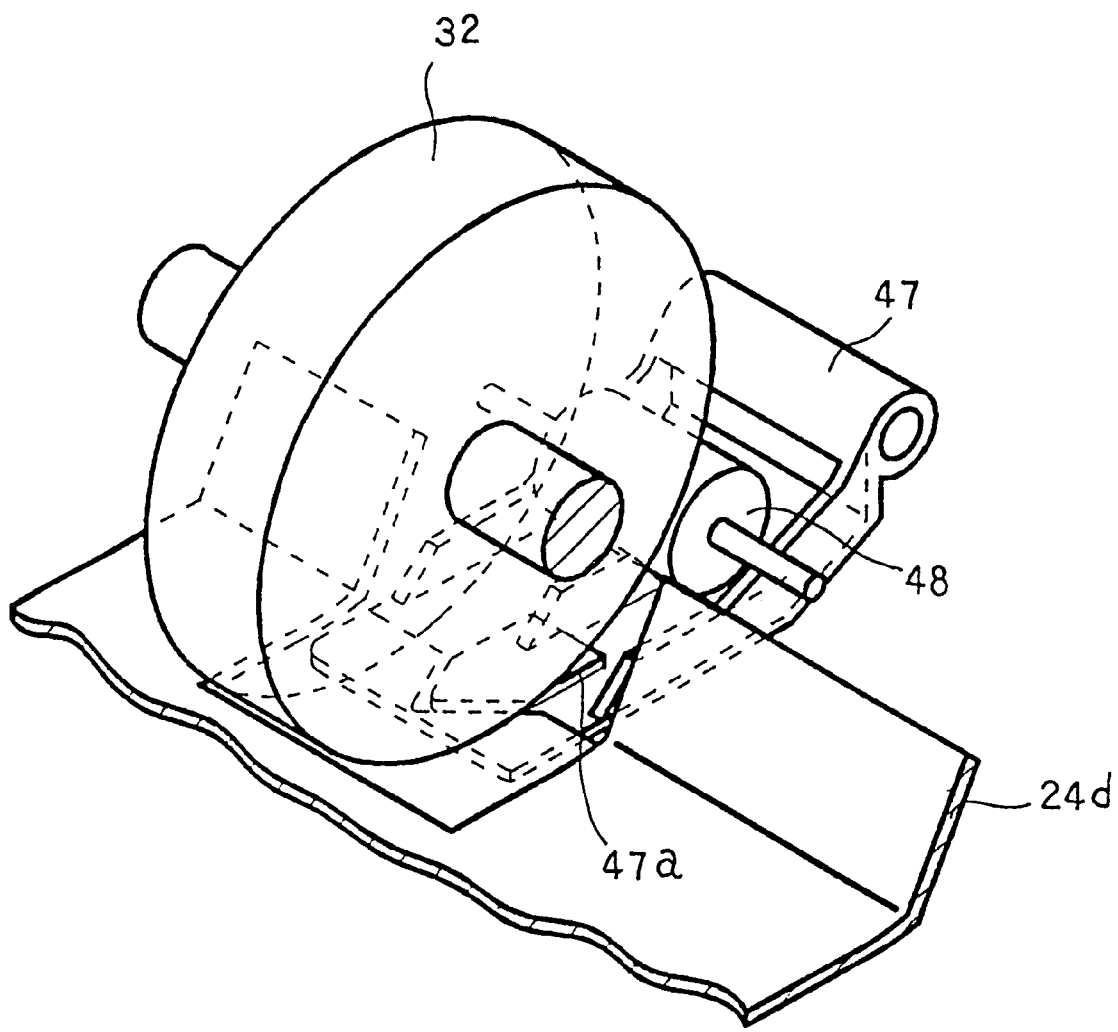
FIG. 4 is a perspective view of the reading part of the document transferring apparatus.
Figure 5:
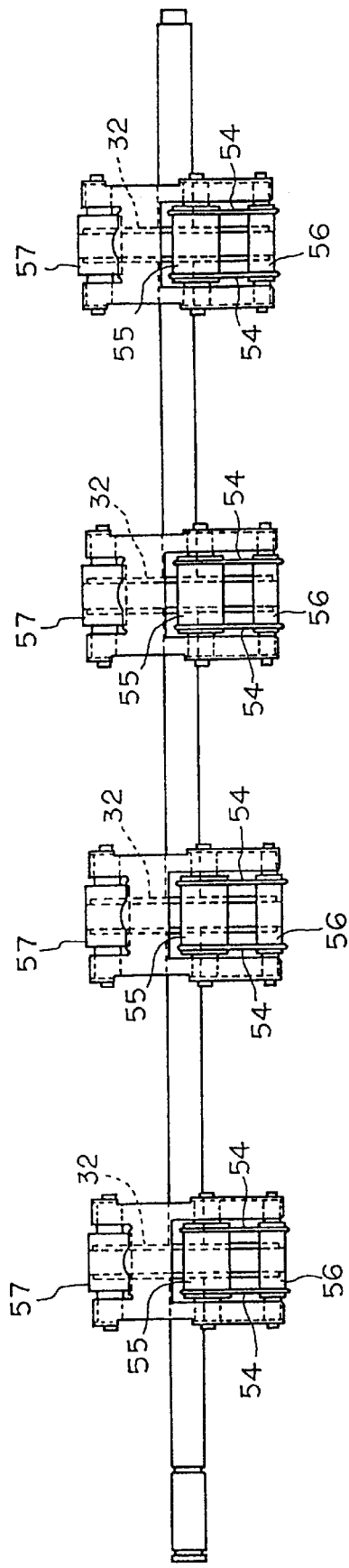
FIG. 5 is a front view of a transfer belt used in the document transferring apparatus.
Figure 6:
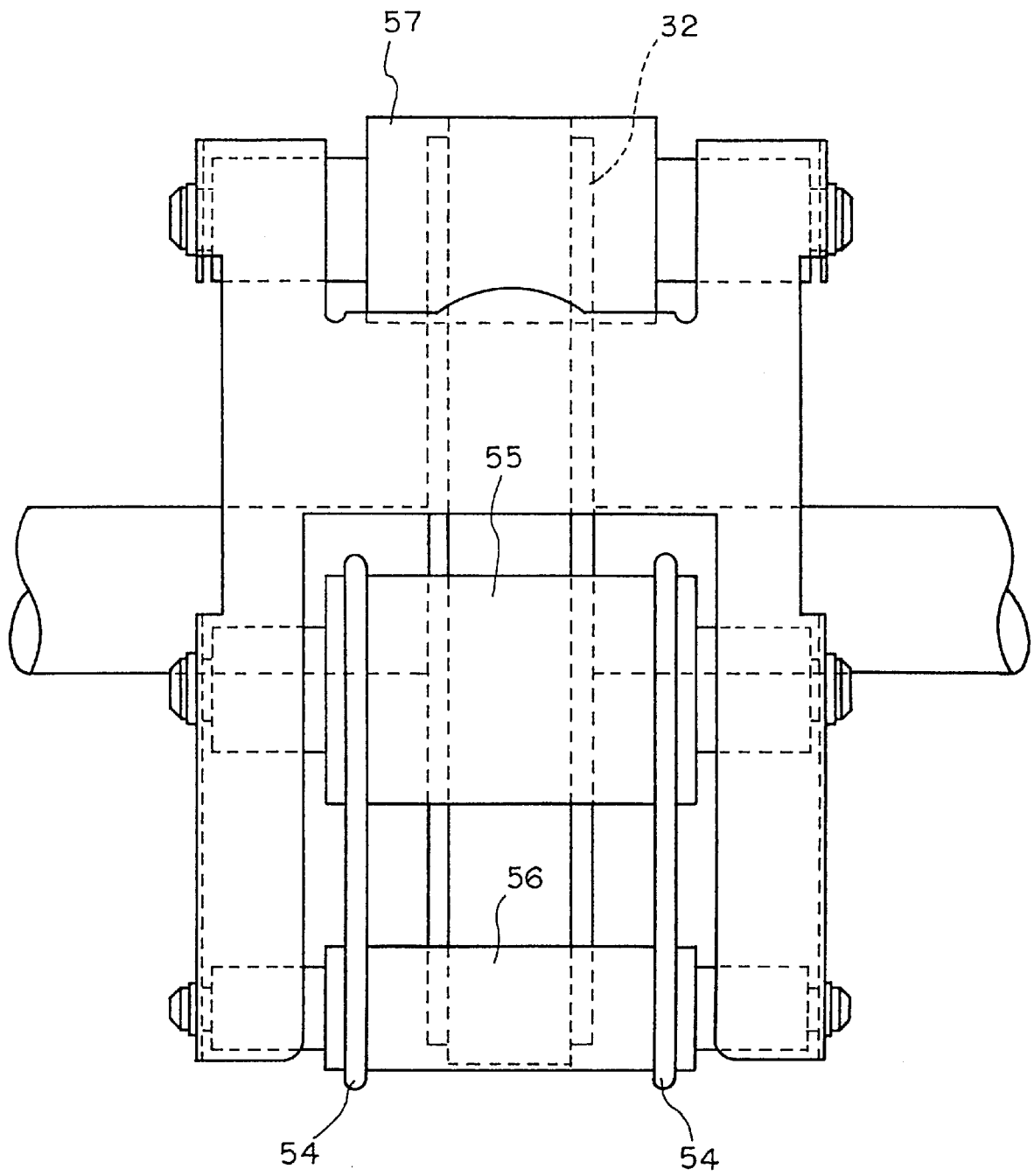
FIG. 6 is an enlarged front view of the transfer belt used in the document transferring apparatus.

Also, as shown in FIG. 3 and FIG. 4, in a side before the reading part 34, there are disposed a scraper 46 for cleaning a reading side of the document and a stock 47 for receiving dusts scraped by the scraper 46, and a distal end of the stock 47 is extended to the vicinity of the feed roller 32 to integrally form a convex 47a thereat. The convex 47a is extended to just before the reading position of the reading part 34, and by holding the document between the convex and the feed roller and transferring the same, there is reduced fluttering or vibration of the document caused by spring of the rear edge of the document when the rear edge of the document is taken out from the feed roller 32 and the second register roller 48. At the same time, the document in a condition floated from the platen glass 12 passes through the reading part 34 so as not to obstruct transferring the document because the leading edge of the document abuts against an end of the abutting scale 53 when the document is transferred. Incidentally, the distance between the convex 47a and the reading position is set within a margin area of the document.

In the first paper ejection path 36 and the second paper ejection path 35, there is provided a transfer belt 54 stretched between a first roller (a first rotating member) 56, which is disposed in downstream side of the transferring direction of the reading part 34, and a second roller (a second rotating member) 55, which abuts against the peripheral surface of the feed roller 32 to be rotated by the feed roller 32. Further, there are provided a roller 57 which abuts against the peripheral surface of the feed roller 32 in the downstream of the transferring direction of the second roller 55; a forward and reverse roller 58 disposed between the first and second paper ejection outlets 31 and 30 and driven by a driving motor, wherein the forward and reverse roller 58 cooperates with a first ejection auxiliary roller 63 at the first paper ejection outlet 31 to eject the document from the first paper ejection outlet 31 or to reversely transfer the document after temporarily transferring the document in the ejecting direction, and cooperates with a second paper ejection auxiliary roller 62 at the second ejection outlet 30 to eject the document from the second paper ejection outlet 30; an intermediate driving roller 59 and an intermediate driving auxiliary roller 60 disposed in a common path 38 of the second paper ejection path 35 and the circulation path 37; a Mylar® member 28 for leading the document, which is reversely transferred from the first paper ejection outlet 31, to the second paper ejection outlet 30 or to the paper supply path 33; and a flapper 61 for changing the transfer path of the document to one of the direction of the second paper ejection outlet 30 and the direction of the paper supply path 33.

Here, the first ejection auxiliary roller 63 is constructed to be supported by a rotating arm 64 driven in a vertical direction by an actuator (not shown) and spaced away from the forward and reverse roller 58 in predetermined timing during switch-back transferring.

Also, in the first paper ejection path 36, there is disposed a sensor 65 which controls reverse timing of the forward and reverse roller 58 based on the detection of the rear edge of the document and recognizes that the document is ejected from the first paper ejection outlet 31. In the second paper ejection path 35, there is disposed a sensor 66 which recognizes that the document is ejected from the second paper ejection outlet 30 based on the detection of the rear edge of the document.

Next, a main part of the document transferring apparatus 14 is explained in detail by using FIG. 2, FIG. 3, and FIG. 4.

In the document transferring apparatus 14, there is arranged a transfer path which is curved from the feed roller 32 and the second register roller 48, which are disposed in the upstream of the platen glass 12, to the feed roller 32 and the second roller 55 disposed in the downstream of the platen glass 12. Here, the second register roller 48 forms first transfer means, and the second roller 55 forms second transfer means.

Here, there is disposed the first roller 56 between the platen glass 12 and a pair of rollers formed of the feed roller 32 and the second roller 55, and the transfer belt 54 is wound between the first roller 56 and the second roller 55. Apart from the second roller 55, in a vicinity thereof, it is possible to provide a roller which abuts against the feed roller 32 to be rotated; however, the second roller 55 is utilized here. Also, the first and second rollers 56, 55 respectively include, as both sides thereof, grooves as wound parts for the transfer belt 54, and are also used as belt pulleys. In the second roller 55, an outer diameter of the wound part is formed larger than the outer diameter of the roller main body abutting against the feed roller 32, and a predetermined set is made such that a rotational speed of the transfer belts 54 is faster than a rotational speed of the second roller 55. Incidentally, although the transfer belts 54 are formed of rubber belts here, outer surfaces of the belts can be formed to have convex and concave so as to further increase frictional engagement force between the surfaces and the leading edge of the document. Incidentally, operation of the transfer belts 54 will be explained in operation of the document transferring apparatus 14 described later.

Figure 7A:
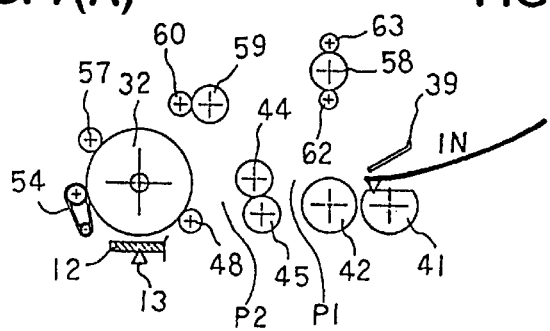
FIG. 7(A) through FIG. 7(H) are schematic views showing a flow of the document by time series when a single-sided document is copied by the document transferring apparatus.

Operation of the document transferring apparatus 14 is explained by using FIG. 7(A) through FIG. 8(I), and by referring FIG. 1 or FIG. 2 if necessary. Firstly, in case of reading the single-sided document, as shown in FIG. 7(A), the documents placed on the stack part 17a of the cover main body 17 are displaced by the paper supply roller 41 and the guide plate 24b, and separated by the separation roller 42 as shown in FIG. 7(B), so that the document is supplied to the register roller 44 and the register auxiliary roller 45. Then, the leading edge of the document abuts against the register roller 44 and the register auxiliary roller 45, which are stopped, and forms a predetermined bend in the space P1 to be aligned.

Figure 7E:
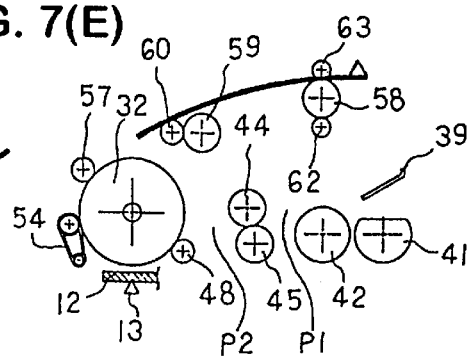
Figure 7B:
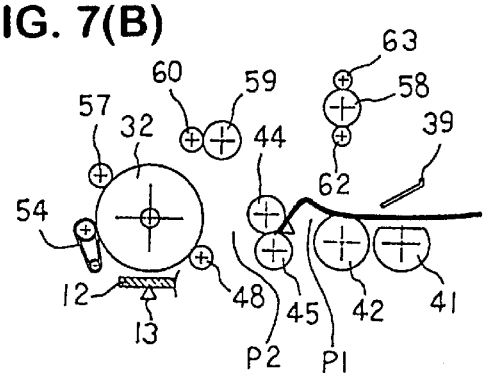
Figure 7F:
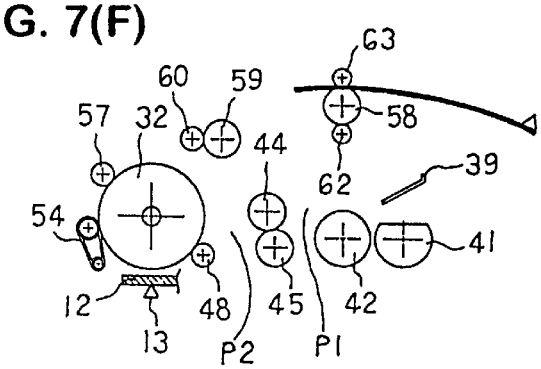
Figure 7C:
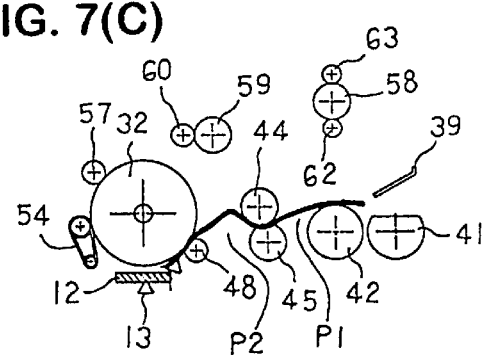

Thereafter, the register roller 44 is rotated, and the leading edge of the document is further supplied between the feed roller 32 and the second register roller 48; but at this time, as shown in FIG. 7(C), rotation of the feed roller 32 is stopped until a predetermined bend is formed in space P2, and when the predetermined bend is formed in the space P2, the feed roller 32 is rotated. Incidentally, the movements of the rollers are controlled by control means CM. The document is transferred and read in the condition that the predetermined bend is formed by driving the register roller 44 and the feed roller 32. By the bend formed in the space P2, it can be prevented that impact occurs when the rear edge of the document passes respectively between the separation roller 42 and the separation pad 43, and between the register roller 44 and the register auxiliary roller 45, and also it can be prevented that the document is temporarily stopped at the reading part 34, so as to enable excellent reading of the image.

The leading edge of the read document which has passed above the reading means 13 reaches the transfer belts 54 and is picked up along rotation of the transfer belts 54. By picking operation by the transfer belts 54, the document is smoothly transferred, and an excellent image can be obtained. Furthermore, since the transfer speed of the document by rotation of the transfer belt 54 is faster than the transfer speed of the document by rotation of the feed roller 32, the document is guided between the feed roller 32 and the second roller 55 without forming looseness (play) between a nip point, which is located between the feed roller 32 and the second roller 55 in the downstream of the reading part 34, and a nip point, which is located between the feed roller 32 and the second register roller 48 in the upstream of the reading part 34. Therefore, even if the rear edge of the document is taken out from the nip point between the feed roller 32 and the second register roller 48, since the leading edge of the document proceeds without looseness, the entire document is smoothly transferred, so that the document can be surely prevented from stopping at the reading part 34.

Figure 7G:
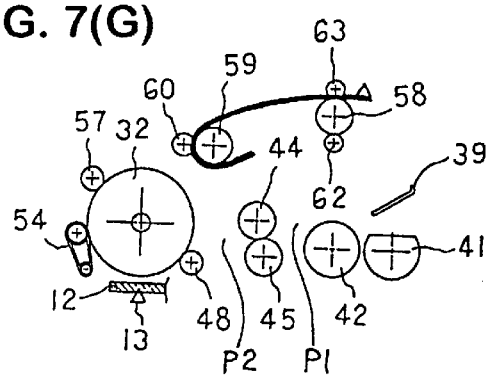
Figure 7D:
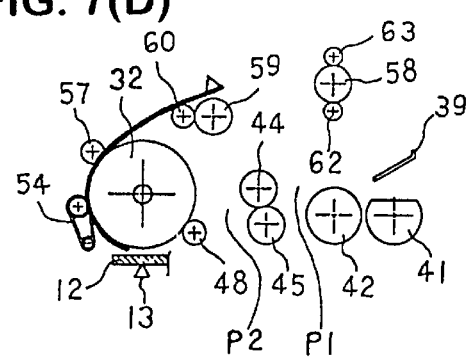
Figure 7H:
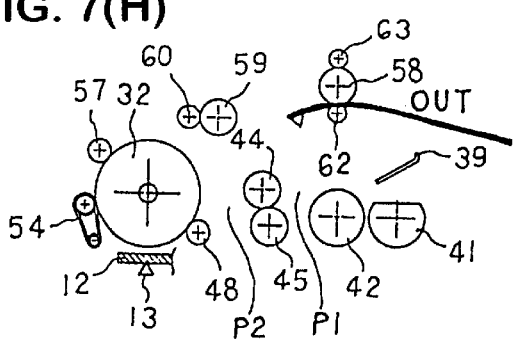

Subsequently, as shown in FIG. 7(D) and FIG. 7(E), by the transfer belts 54 and a roller 57, the document is guided to the first paper ejection path 36. Then, as shown in FIG. 7(F), after the leading edge of the document is ejected from the first paper ejection outlet 31, the forward and reverse roller 58 is reversely rotated, and as shown in FIG. 7(G), the document is reversely transferred in the first paper ejection path 36 to be guided to the second paper ejection path 35. And, as shown in FIG. 7(H), by the forward and reverse roller 58 and the second paper ejection auxiliary roller 62, the document is ejected from the second paper ejection outlet 30, and the rear edge side of the document is placed on the paper ejection plate 17c to be ejected.

Figure 8A:
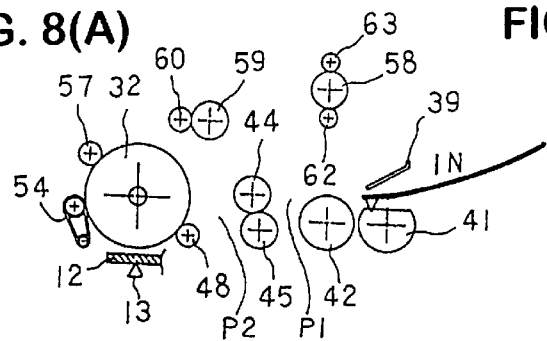
FIG. 8(A) through FIG. 8(I) are schematic views showing a flow of the document by time series when a double-sided document is read from a front surface thereof by the document transferring apparatus.
Figure 8B:
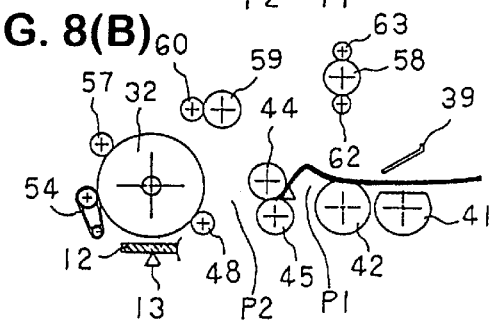

Next, in case of reading the double-sided document from the front surface thereof, as shown in FIG. 8(A), the documents placed on the stack part 17a are supplied by the paper supply roller 41, and as shown in FIG. 8(B), the document is separated by the separation roller 42 and abuts against the register roller 44 and the register auxiliary roller 45 so that the predetermined bend is formed in the space P1 to be aligned.

Figure 8C:
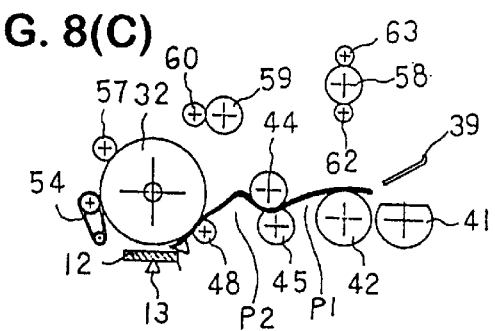

As shown in FIG. 8(C), the document is guided to the reading part 34 by driving the register roller 44 and the feed roller 32 as in the case of reading the single-sided document, and the front surface of the document is read by the reading means 13. The document is sent by rotation of the feed roller 32, and as in the case of reading the single-sided document, the leading edge of the document which passes above the reading means 13 reaches the transfer belts 54, and is picked up in the rotational direction of the transfer belts.

Figure 8D:
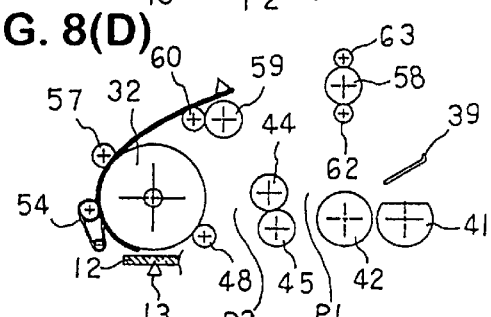
Figure 8E:
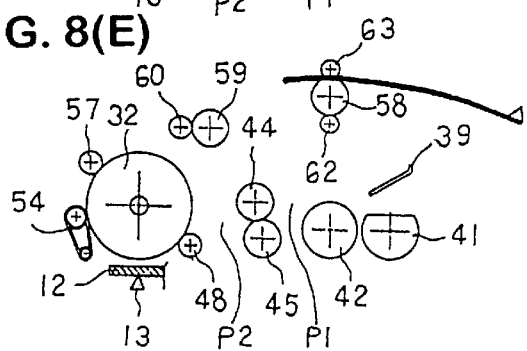
Figure 8F:
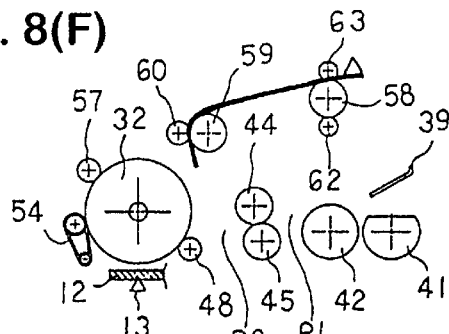
Figure 8G:
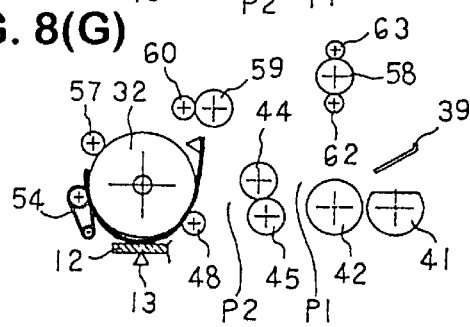
Figure 8H:
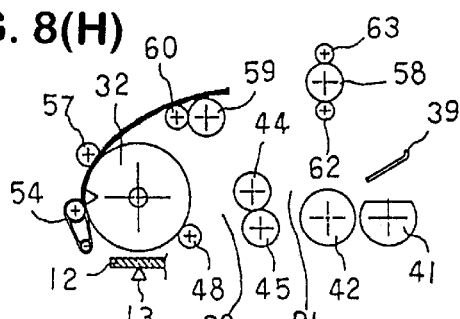
Figure 8I:
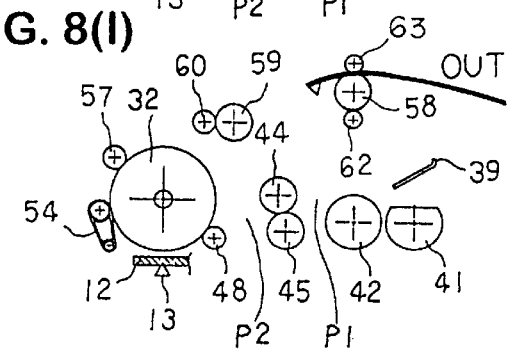
Figure 9:
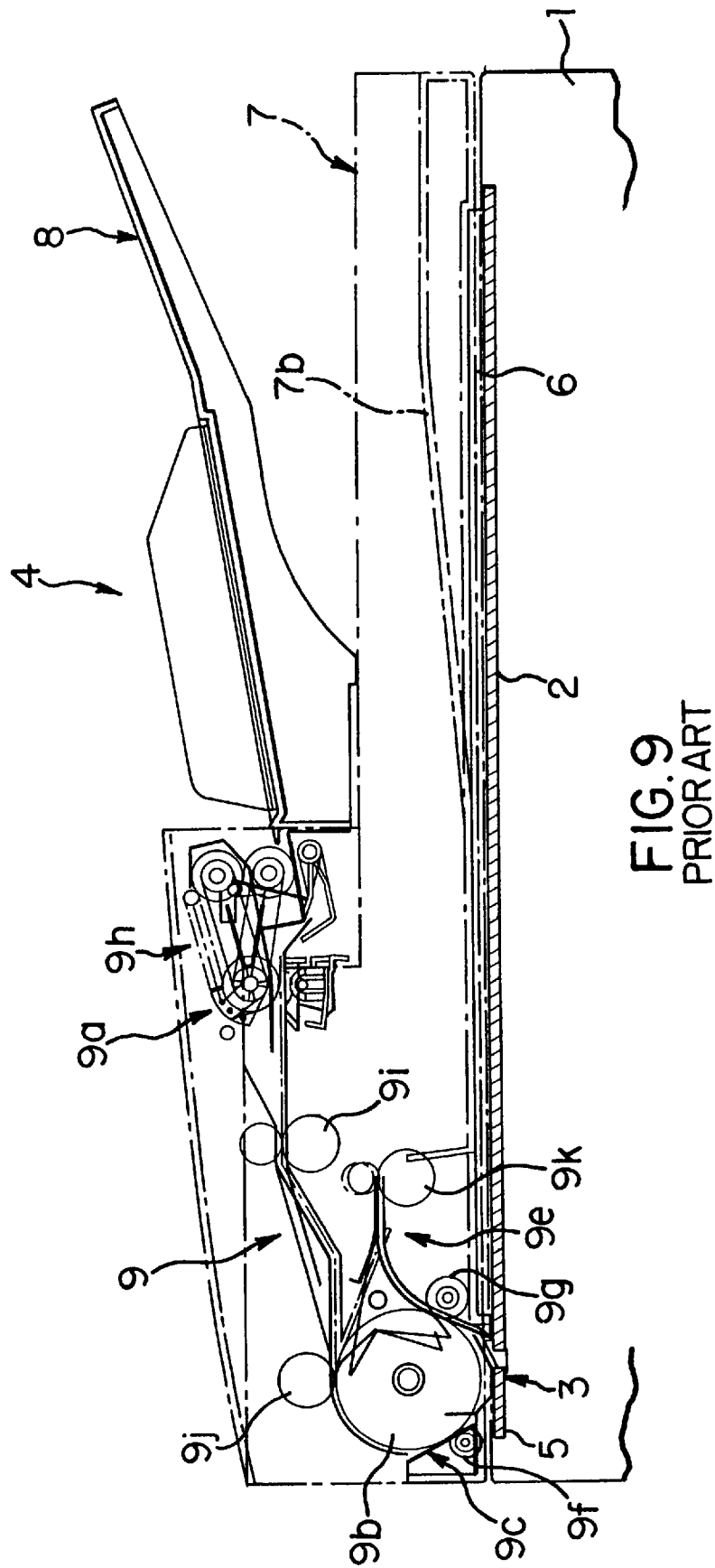
FIG. 9 is a vertical section view of a conventional automatic document feeder.

Next, as shown in FIG. 8(D) and FIG. 8(E), after the document is transferred through the first paper ejection path 36 and the leading edge side of the document is ejected from the first paper ejection outlet 31, the forward and reverse roller 58 is reversely rotated, and as shown in FIG. 8(F), the document is guided from the first paper ejection path 36 to the circulation path 37. And, as shown in FIG. 8(G), the document is again returned from the circulation path 37 to the paper supply path 33, and a rear surface of the document is read by the reading means 13. Here again, by the operation of the transfer belts 54, the document is smoothly picked up and nipped between the feed roller 32 and the second roller 55. Thereafter, as shown in FIG. 8(H) and FIG. 8(I), the document whose both surfaces are read is transferred in the first paper ejection path 36, and ejected from the first paper ejection outlet 31 by operation of the forward and reverse roller 58 and the first paper ejection auxiliary roller 63.

Incidentally, although the rotation of the feed roller 32 is stopped until predetermined bend of the document is formed in the space P2 in the above described embodiment, it is possible that the document is supplied while the feed roller 32 is rotating, and the predetermined bend is formed in the space P2 by gradually accelerating circumferential speed of the register roller 44, and after predetermined bent is formed, the circumferential speed of the register roller 44 is gradually returned to the original circumferential speed. Furthermore, if the circumferential speed of the register roller is set to be high speed so as to form bend in the space P2 just before the rear edge of the document passes between the separation roller 42 and the separation pad 43, or between the register roller 44 and the register auxiliary roller 45, the document can pass between these rollers without returning the circumferential speed of the register roller 44 to the original speed after adequate bend is formed. Namely, any means can be adopted as long as enough bend is formed until the supply rear edge of the document passes between the separation roller 42 and the separation pad 43, and between the feed roller 32 and the second register roller 48.

What is claimed is:

1. An automatic document feeder comprising a platen including a reading position for reading an image of a transferring document, a feed roller device for transferring the document to the reading position on the platen, a roller for supplying the document to the feed roller device, and control means for controlling the roller to have a speed substantially same as a document transfer speed of the feed roller device, wherein said control means controls such that when the roller transfers the document, a document transfer speed of the roller becomes temporarily faster than the document transfer speed of the feed roller device.

2. An automatic document feeder according to claim 1, wherein the feed roller device is formed of a feed roller disposed on the platen for windingly transferring the document, and document pressing means disposed in an upstream side in a transferring direction of the reading position and pressing the document against the feed roller.

3. An automatic document feeder according to claim 2, wherein said document pressing means is formed of a pinch roller engaging the feed roller or an elastic plate.

4. An automatic document feeder according to claim 3, wherein a speed of the roller for supplying is set to be faster than a speed of the feed roller which is stopped and on standby so as to form a loop of the document between the roller for supplying and the feed roller.

5. An automatic document feeder according to claim 1, wherein the control means accelerates the document transfer speed of the roller to be faster than the document transfer speed of the feed roller device before the document reaches a reading start position.

6. An automatic document feeder according to claim 1, wherein after reading the document is started and before a rear edge of the document passes the roller for supplying, the control means accelerates the document transfer speed of the roller for supplying to be temporarily faster than the document transfer speed of the feed roller device.

7. An automatic document feeder according to claim 6, wherein the document transfer speed of the roller for supplying is gradually accelerated to be faster than the document transfer speed of the feed roller device.

8. An automatic document feeder comprising, first transfer means for transferring a document disposed in an upstream transfer path relative to a reading position, second transfer means for transferring the document disposed in a downstream transfer path, a curved transfer path disposed between the upstream and downstream transfer paths for guiding the document from the first transfer means to the second transfer means through the reading position, and a transfer belt disposed to extend along the curved transfer path for guiding the document to the second transfer means.

9. An automatic document feeder according to claim 8, wherein the transfer belt is disposed outside the curved transfer path.

10. An automatic document feeder according to claim 8, wherein the transfer belt extends between a first rotating member near a platen and a second rotating member, which is disposed away from the first rotating member with a predetermined space.

11. An automatic document feeder according to claim 10, wherein said second transfer means includes a roller used as the second rotating member.

12. An automatic document feeder according to claim 8, wherein a document transfer speed is the same in the first transfer means and the second transfer means, said transfer belt having a document transfer speed faster than the document transfer speed in the first transfer means and the second transfer means.

13. An automatic document feeder according to claim 12, wherein said first transfer means includes a feed roller disposed above a platen, and a roller pressed against a peripheral surface of the feed roller and disposed in the upstream transfer path, said second transfer means includes a roller pressed against the feed roller and disposed in the downstream transfer path.

* * * * *